US005634487A

United States Patent [19]

Downey

[11] Patent Number: 5,634,487

[45] Date of Patent: Jun. 3, 1997

[54] WATER TANK AND GATED DUMP VALVE FOR FIRE TRUCKS

[76] Inventor: Paul J. Downey, 290 Missouri Valley Rd., Shoshoni, Wyo. 82649

[21] Appl. No.: 491,604

[22] Filed: Jun. 16, 1995

[51] Int. Cl.$^6$ .................................................... A01G 25/09

[52] U.S. Cl. .................... 137/355.12; 137/899; 137/565; 251/144; 251/298; 251/301

[58] Field of Search ............................. 137/355.12, 899, 137/565; 251/298, 58, 144, 301

[56] References Cited

U.S. PATENT DOCUMENTS

| | | | |
|---|---|---|---|
| 1,264,679 | 4/1918 | Peck | 137/899 |
| 3,810,487 | 5/1974 | Cable et al. | 137/355.12 |
| 4,552,181 | 11/1985 | Hawkins | 137/899 |
| 4,730,180 | 3/1988 | Riddell et al. | 280/4 |
| 4,913,398 | 4/1990 | Ziaylelc, Jr. et al. | 251/298 |
| 4,951,704 | 8/1990 | Reber | 137/351 |
| 5,167,257 | 12/1992 | Erpenbeck | 137/875 |
| 5,269,343 | 12/1993 | Trapp | 137/554 |
| 5,392,814 | 2/1995 | Brotcke et al. | 137/899 |

FOREIGN PATENT DOCUMENTS

| | | | |
|---|---|---|---|
| 15781 | 9/1900 | United Kingdom | 137/899 |

*Primary Examiner*—A. Michael Chambers
*Attorney, Agent, or Firm*—Richard C. Litman

[57] ABSTRACT

A water tank for a fire truck constructed of a foam and fiber glass composite material. The tank is generally rectangular in shape and has two large compartments, one being at the front and the other being at the rear of the tank. The front compartment has two access doors provided in the left side panel and in the right side panel respectively of the tank. The rear compartment has five access doors, three doors being provided in rear panel and two doors being provided in the side panels of the tank. A gated dump valve for dumping the water in the tank is also provided. The valve has a gate that is used to control the direction of flow of the water being dumped from the tank. Depending on the position of the gate water will flow either from the rear of the truck or from the side of the truck. Provision is made for both the opening and closing of the valve and the changing of the gate position to be controlled from inside the cab of the truck.

14 Claims, 4 Drawing Sheets

WATER TANK AND GATED DUMP VALVE FOR FIRE TRUCKS

BACKGROUND OF THE INVENTION

1. Field of the Invention

The present invention relates to a water tank for fire trucks or fire engines and a gated dump valve for use with the water tanks of fire trucks or fire engines.

2. Description of the Prior Art

Most conventional fire trucks are equipped with a water tank so that they may carry their own water supply for dowsing fires. This feature is particularly important when the fire is in a location not served by fire hydrants. Even when fire hydrants are present it may be desirable to first supply water from the hydrant to the tank, and then pump water from the tank to the water hoses. This technique allows a relatively constant head to be maintained at the inlet to the pump or pumps supplying the hoses.

In addition, most fire truck tanks are provided with a dump valve to allow the water in the tank to be dumped after the fire is put out so the truck will be lighter and thus use less fuel on the trip back to the fire station, or the water may have to be dumped to allow the cleaning of the tank. Further, if the truck is being used to fill a temporary reservoir, as is commonly done by fire fighters in rural areas, the process of filling the reservoir can be speeded up by using the dump valve to quickly transfer the water in the tank to the reservoir.

Fire trucks having tanks and dump valves are well known in the art, however most current fire trucks are highly specialized pieces of equipment that are extremely expensive to procure and to operate. With shrinking local government budgets, a need exists nation wide for an inexpensive tank truck system that can provide the same capabilities as a conventional fire truck. None of the prior art discussed below is seen to teach or suggest the novel and unobvious construction of the water tank and gated dump valve of the present invention which allows for the inexpensive and simple manufacture of fire trucks.

U.S. Pat. No. 4,552,181, issued to Hawkins, shows directional dump valve for tank trucks. The Hawkins patent does not disclose the unique construction of the water tank of the present invention. Further, the Hawkins patent does not disclose the pneumatic actuation system of the present invention or the structure of the gate used in the dump valve of the present invention.

U.S. Pat. No. 4,730,180, issued to Riddell et al., shows a hose payout system for the back of a fire truck. The Riddell et al. patent does not disclose the unique construction of the water tank of the present invention. Further, the Riddell et al. patent does not disclose the pneumatic actuation system of the present invention or the structure of the gate used in the dump valve of the present invention.

U.S. Pat. No. 4,951,704, issued to Reber, shows an overflow relief drain for a truck mounted tank. The Reber patent does not disclose the unique construction of the water tank of the present invention. Further, the Reber patent does not disclose the pneumatic actuation system of the present invention or the structure of the gate used in the dump valve of the present invention.

U.S. Pat. No. 5,167,257, issued to Erpenbeck, shows an exhaust directing valve for directing the exhaust gas flow from a vehicle's engine. The Erpenbeck patent does not disclose the unique construction of the water tank of the present invention. Further, the Erpenbeck patent does not disclose the pneumatic actuation system of the present invention or the structure of the gate used in the dump valve of the present invention.

U.S. Pat. No. 5,269,343, issued to Trapp, shows a valve actuator for opening and closing shut-off valves on fire trucks. The Trapp patent does not disclose the unique construction of the water tank of the present invention. Further, the Trapp patent does not disclose the pneumatic actuation system of the present invention or the structure of the gate used in the dump valve of the present invention.

None of the above inventions and patents, taken either singly or in combination, is seen to describe the instant invention as claimed.

SUMMARY OF THE INVENTION

The present invention is directed to a water tank and a gated or directional dump valve for fire trucks. The tank is generally rectangular in shape and has two large compartments, one being at the front and the other being at the rear of the tank. The front compartment has two access doors provided in the left side panel and in the right side panel respectively of the tank. The rear compartment has five access doors, three doors being provided in rear panel and two doors being provided in the side panels of the tank. The tank is constructed of a foam and fiberglass composite material.

The gated dump valve is used for dumping the water in the tank. The valve has a gate that is used to control the direction of flow of the water being dumped from the tank. Depending on the position of the gate water will flow either from the rear of the truck or from the side of the truck. Provision is made for both the opening and closing of the valve and the changing of the gate position to be controlled from inside the cab of the truck.

Accordingly, it is a principal object of the invention to provide a water tank for a fire truck that is inexpensive and simple to manufacture.

It is another object of the invention to provide a water tank for a fire truck that integral storage compartments.

It is a further object of the invention to provide a water tank for a fire truck that can easily be fitted to conventional trucks.

Still another object of the invention is to provide a gated dump valve which can selectively dump water either out of the rear of the truck or the side of the truck.

Still another object of the invention is to provide a gated dump valve which can be operated from inside the cab of the truck.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
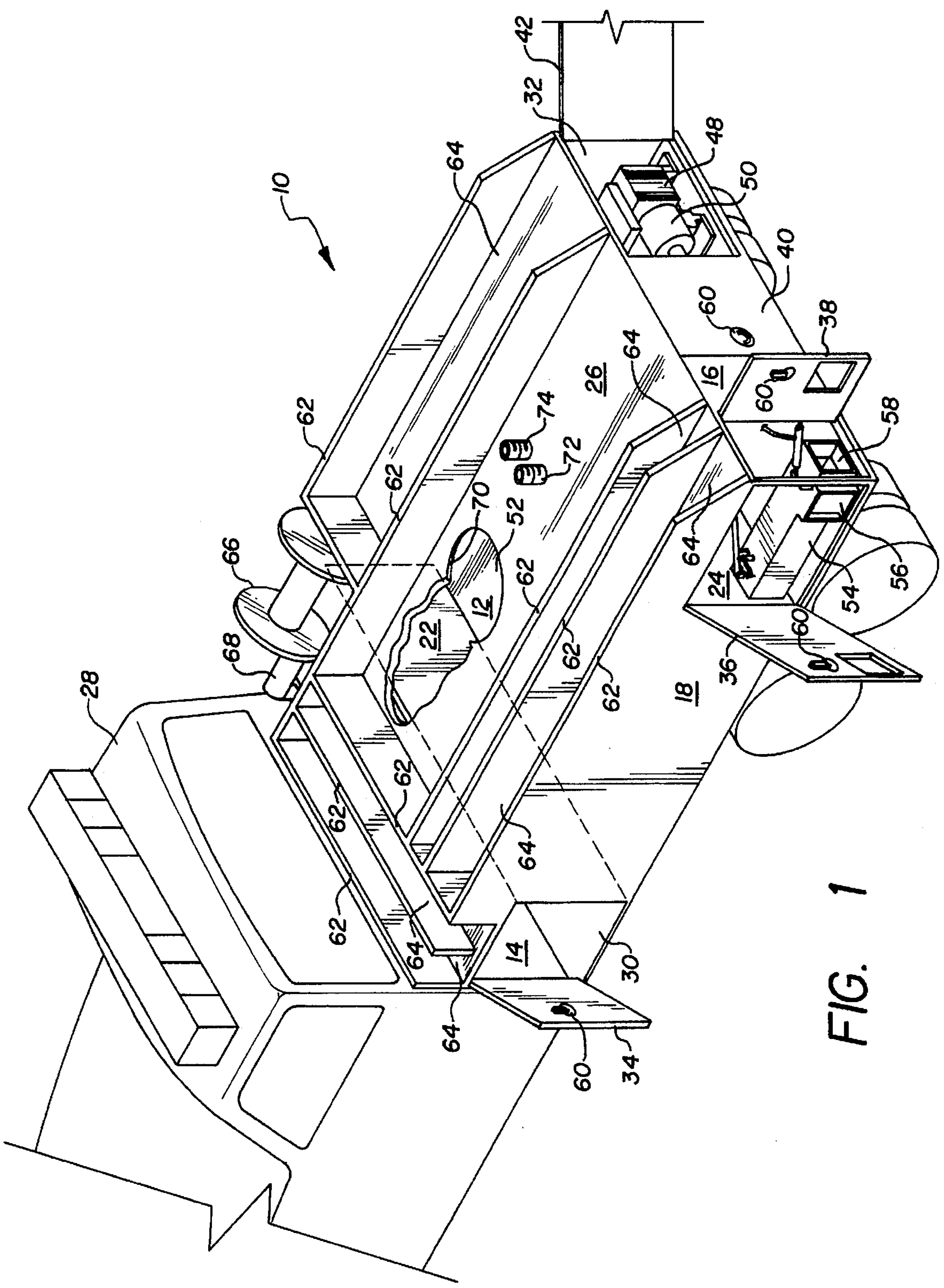
FIG. 1 is an environmental perspective of the tank and dump valve of the present invention mounted on the rear of a truck.
Figure 2:
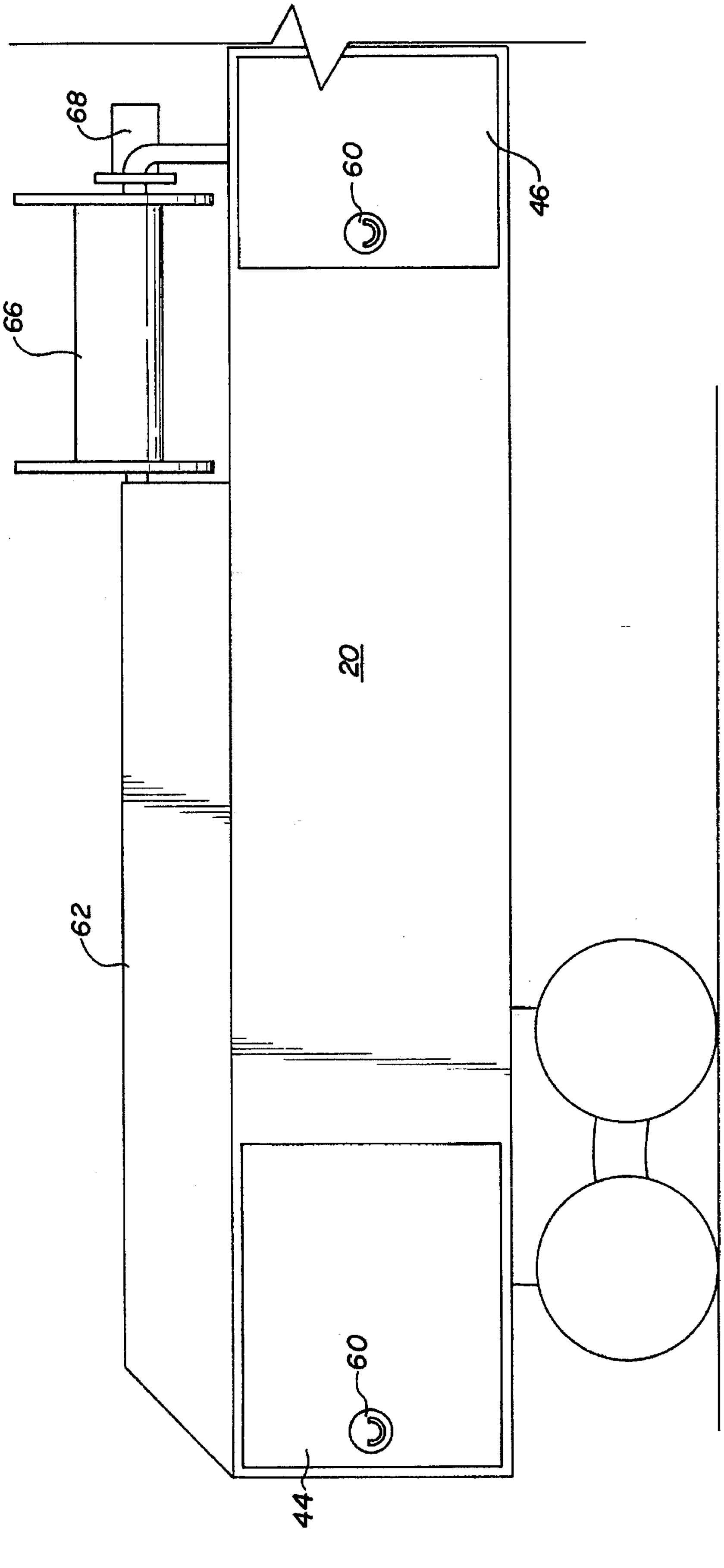
FIG. 2 is a fragmentary environmental view showing the right side of the water tank of the present invention.

The present invention relates to a water tank for fire trucks. Referring to FIGS. 1 and 2, the water tank 10 has a bottom 12, a front panel 14, a rear panel 16, a left side panel 18, a right side panel 20, a front partition 22, rear partition 24, and top 26.

In use the tank 10 is mounted to the rear of truck 28 using conventional means. The space between the front panel 14 and the front partition 22 forms the front compartment 30. The space between the rear panel 16 and the rear partition 24 forms the rear compartment 32. The space between the front and rear partitions 22 and 24 forms the water storage space 52.

Cutouts are formed in the left side panel 18, right side panel 20, and rear panel 16 to allow for installation of access doors 34, 36, 38, 40, 42, 44, and 46. The front compartment 30 acts as 81 storage area for equipment. The rear compartment 32 houses a small gasoline engine 48.

The engine 48 drives a centrifugal pump 50 which is used to pump water to or from the water storage area 52. The engine 48 and the pump 50 are located on the leftmost portion of the rear compartment 32.

The middle portion of rear compartment 32 houses the necessary piping and valves connecting the water storage 52 to pump 50, and pump 50 to the fire hoses which ultimately direct the water onto the fire. The piping and valves housed in the middle portion of rear compartment 32 will be discussed in greater detail below.

The rightmost portion of rear compartment 32 houses the gated dump valve 54 which selectively dumps water from storage area 52 either out the rear of the truck 28 or the right side of truck 28. Doors 36 and 38 have cutouts which register respectively with the side chute 56 and rear chute 58, when doors 36 and 38 are closed. Access doors 34, 36, 38, 40, 42, 44, and 46 are all provided with locking latches 60.

The top 26 has vertical ridges 62 extending therefrom. The ridges 62 form storage bays 64 used for storing fire fighting equipment including rolled up hoses and ladders. Also mounted on top 26 is a powered hose reel 66. Preferably, one output of the pump 50 supplies water to the hose reel 66. Hose reel 66 is powered by an electric motor 68 which can, for example, derive energy from a 12 volt battery (not shown). The top 26 also has a manhole 70 which allows access to the interior of water storage area 52. Also protruding from top 26 are pipes 72 and 74 which protrude from tank 10 at a location above the water storage area 52. The pipes 72 and 74 serve as connections for conduits used for filling storage 52.

The tank 10 is made of rigid plastic foam material sandwiched between layers of fiberglass. Suitable foams include all foams which are useful as structural and construction materials and have the necessary strength to withstand the pressure exerted by the water in the tank, when the foam is coated by fiberglass on both sides. Such foams are well known and include, but are not limited to, polystyrenes, polyolefins, polyurethanes, and chlorinated polyolefins.

The process for constructing tank 10 is initiated by laying down a foam panel which will later form the bottom 12. Foam panels for forming the vertical panels 14, 16, 18, 20, 22, and 24 are then fixed to the bottom panel. A foam panel for forming the top 26 is then fixed in place. Then foam panels for forming ridges 62 are fixed to the top foam panel. Next manhole and access door openings are cut. The foam structure is then sprayed with a fiberglass composition, including primarily glass fibers and a binder as is well known, on all interior and exterior surfaces until the desired thickness of fiberglass is accumulated. The desired thickness of the fiberglass layer is dictated by the structural strength required to maintain the structural integrity of the tank under operational loads. These loads are a function of many variables including the depth of the tank. Therefore, the desired thickness of the fiberglass layer is most effectively determined empirically. The fiber glass composition is then allowed to set thus creating the structure of tank 10. A colored rosin coating and/or coats of paint may be applied to the finished structure to give the desired color to tank 10.

Figure 3:
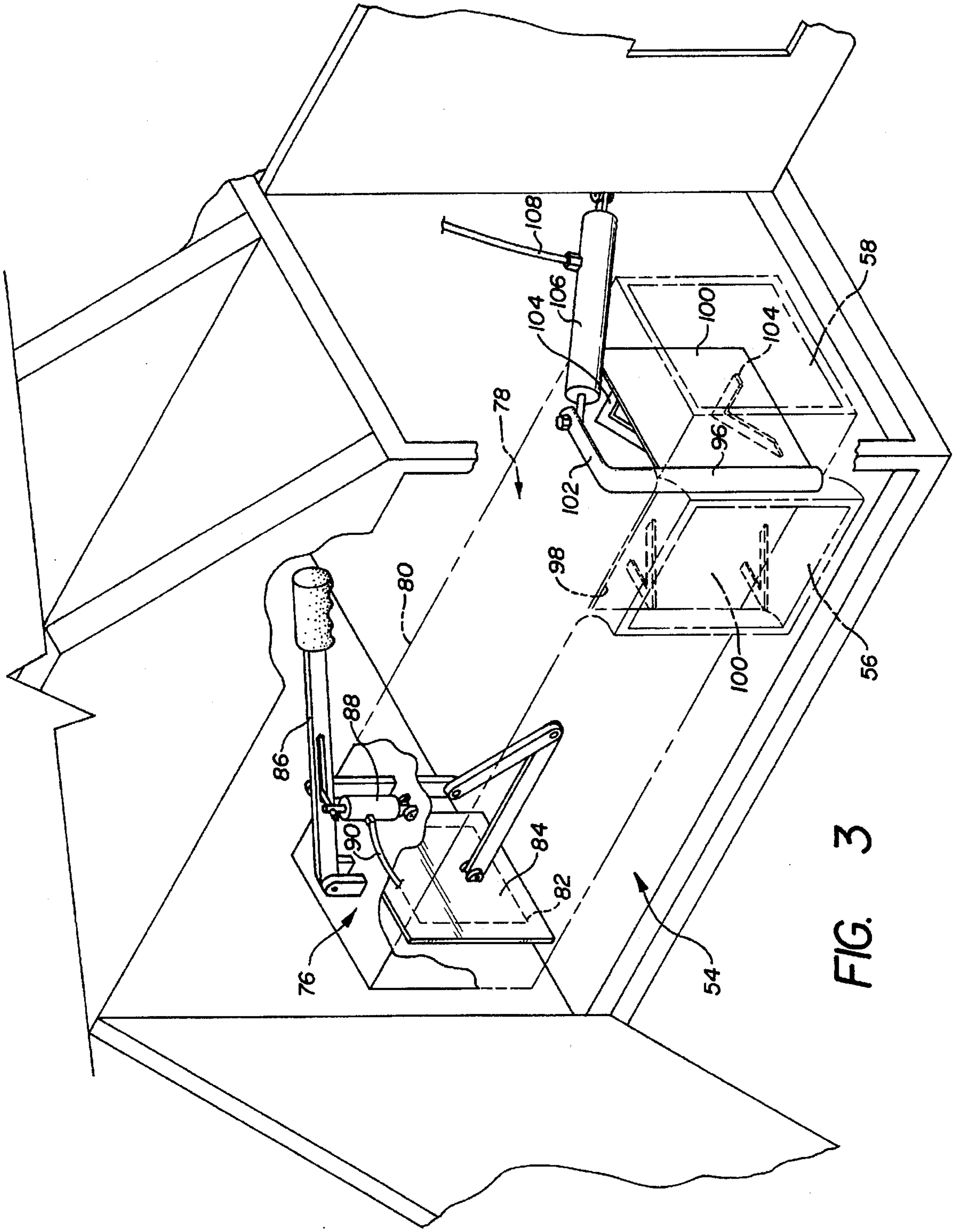
FIG. 3 is fragmentary perspective view, partially broken away to show the internal details of the directional dump valve of the present invention.

A cutout made in the rear partition 24 provides fluid communication between storage 52 and dump valve 54. This cutout can be made before or after the spraying of the fiberglass. Referring to FIG. 3 the dump valve 54 has a valve portion 76 and a gate portion 78. The dump valve 54 is formed of a square shaped duct 80. The valve portion 76 includes a seat 82 provided in duct 80. A flap 84 seated on seat 82 prevents water flow from storage 52 through duct 80. Handle 86 can be used to manually move flap 84 away from seat 82. Alternatively, air cylinder 88 supplied by air hose 90 can be used to move flap 84 from seat 82. When flap 84 is moved away from seat 82, the water in storage area 52 is dumped through duct 80. Air cylinder 88 provides a servomechanism for opening and closing valve portion 76 remotely, preferably from inside the cab of truck 28.

The gate portion 78 includes a rear chute 58 and a side chute 56. The rear chute 58 is essentially a continuation of the duct 80. The side chute 56 branches off from duct 80 to the left sidle of tank 10, such that the outlet of side chute 56 is at a right angle to the outlet of rear chute 58. A shaft 96 passes through duct 80 at approximately the same location as the vertical edge, farthest from valve portion 76, of the opening 98 in duct 80. The shaft 96 hingedly support gate 100 within duct 80. Gate 100 is movable between a first position and a second position. In the first position gate 100 shuts off communication between duct 80 and rear chute 58, allowing water to dumped from side chute 56. In the second position gate 100 shuts off communication between duct 80 and side chute 56, allowing water to dumped from rear chute 58. The arm 102, fixed to shaft 96, is used to move gate 100 between the first and second positions. Stiffening braces 104 give added rigidity to the gate 100.

As before an air cylinder 106 supplied by air hose 108 can be used to move gate 100 between the first and second positions. Air cylinder 106 provides a servomechanism for moving gate 100 between the first and second positions remotely, preferably from inside the cab of truck 28.

It should be readily apparent to those skilled in the art that other servomechanisms such as mechanical and electromechanical servomechanisms can also be used to remotely actuate the valve portion 76 and the gate portion 78.

Figure 4:
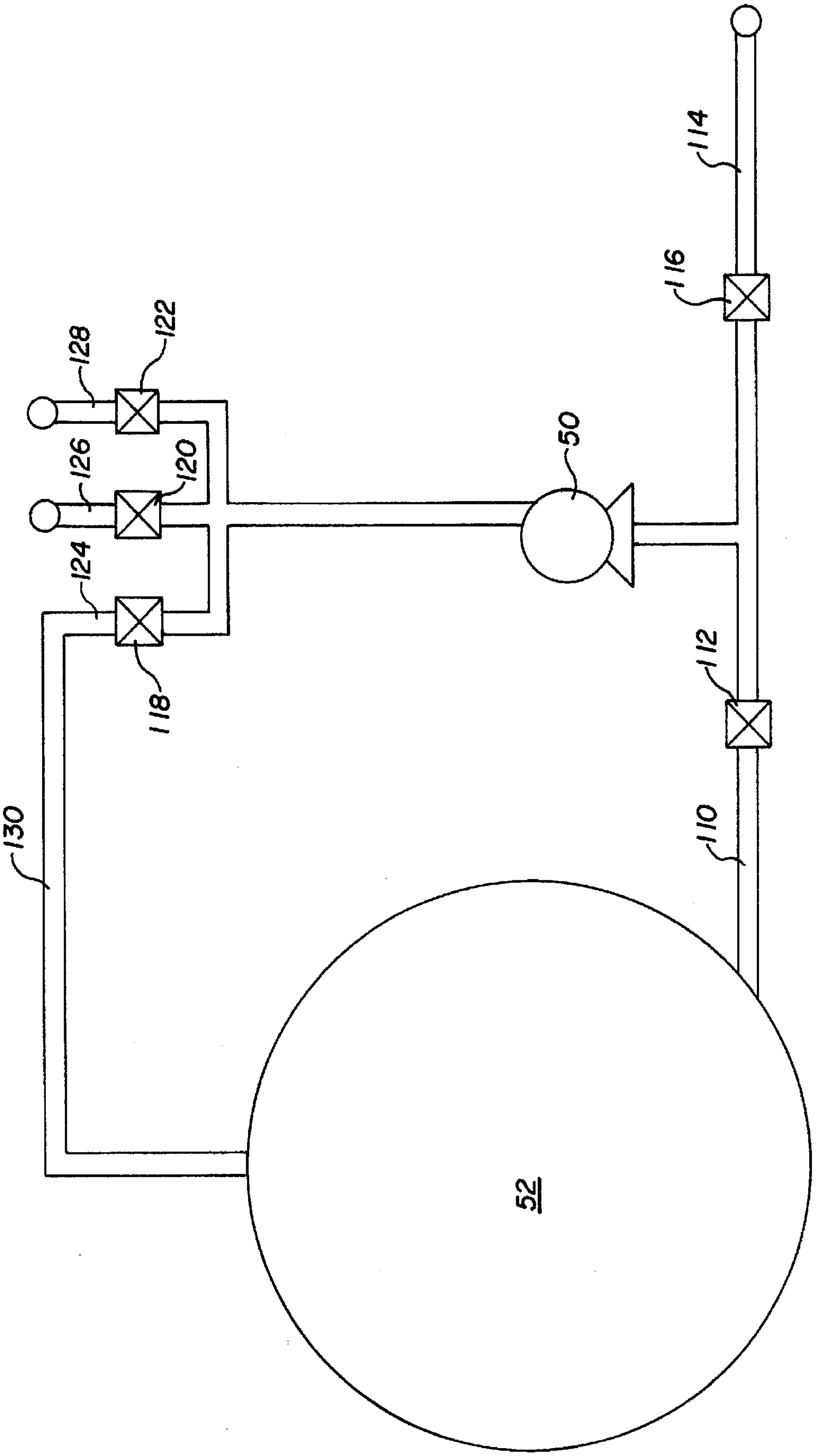
FIG. 4 is a schematic drawing showing the piping arrangement of the water tank of the present invention.

Referring to FIG. 4, a schematic diagram showing the valves and piping associated with tank 10 is seen. Pipe 110 connects water storage 52, via valve 112, to the inlet of pump 50 and pipe 114. A valve 116 is provided on pipe 114. The outlet of pump 50 is connected to a plurality of valves. In this example, three such valves, 118, 120, and 122, are shown. The outlets 124, 126, and 128 of valves 118, 120, and 122 are suitably configured to allow attachment of fire hoses or other conduits. In the example shown in FIG. 4, a conduit 130 connects valve 118, via either pipe 72 or 74 (see FIG. 1), to water storage 52. The other valves 120 and 122 can used to connect fire hoses (not shown).

To fill water storage 52, valves 112, 120, and 122 are closed and valves 118 and 116 are opened. Pipe 114 is connected, via a conduit (not shown), to a water source such as a lake or a pond for example. Pump 50 is then turned on to pump water from the water source to water storage 52 via conduit 130. To empty water storage 52, as an alternative to using dump valve 54, both valves 112 and 116 are opened with pump 50 turned off. For emptying purposes, water storage 52 can be vented to the atmosphere using either manhole 70 or pipes 72, 74. To pump water to the fire hoses, valves 118 and 116 are closed and valves 112, 120, and 122 are opened. With the valves in this configuration, turning on pump 50 will pump water from water storage 52 to the fire hoses (not shown) attached to outlets 126 and 128.

It is to be understood that the present invention is not limited to the sole embodiment described above, but encompasses any and all embodiments within the scope of the following claims.

I claim:

1. A water tank for a fire truck comprising:

a bottom panel of a predetermined size and having front, rear, left, and right edges;

a top panel having front, rear, left, and right edges and being of substantially the same size as said bottom panel, said top panel being parallel to said bottom panel, said top panel being spaced apart from said bottom panel, and said top panel being in registry with said bottom panel;

a front panel extending between said front edge of said bottom panel and said front edge of said top panel;

a rear panel extending between said rear edge of said bottom panel and said rear edge of said top panel;

a left side panel extending between said left edge of said bottom panel and said left edge of said top panel;

a right side panel extending between said right edge of said bottom panel and said right edge of said top panel;

a front partition parallel to and spaced apart from said front panel, said front partition extending between said bottom panel and said top panel; and a rear partition parallel to and spaced apart from said rear panel, said rear partition extending between said bottom panel and said top panel, said front panel, bottom panel, top panel, and front partition defining a front compartment having an interior, said rear panel, bottom panel, top panel, and rear partition defining a rear compartment having an interior, and said front partition, bottom panel, top panel, and rear partition defining a water storage space.

2. The water tank for a fire truck according to claim 1, further including a plurality of ridges extending perpendicularly from said top panel in a direction away from said bottom panel, said plurality of ridges defining storage bays for storing equipment.

3. The water tank for a fire truck according to claim 1, further including a hose reel provided on said top panel.

4. The water tank for a fire truck according to claim 1, further including:

a plurality of access doors provided in said rear panel, said left side panel, and said right side panel for allowing access to the interior of said rear compartment; and a right front access door and a left front access door provided in said right side panel and said left side panel respectively, said right front access door and said left front access door allowing access to the interior of said front: compartment.

5. The water tank for a fire truck according to claim 1, further including;

an engine housed in said rear compartment;

a pump housed in said rear compartment, said pump having an inlet and an outlet, and being powered by said engine;

a first pipe connecting said water storage space to the inlet of said pump; and a second pipe connected to the outlet of said pump at a first end thereof, and said second pipe being configured at a second end thereof to be connectable to a fire hose, whereby water can be pumped from said water storage space to the fire hose.

6. The water tank for a fire truck according to claim 1, wherein said water tank is constructed of a material comprising foam sandwiched between first and second layers of fiberglass.

7. The water tank for a fire truck according to claim 1, further including a gated dump valve for dumping water from said water storage space said gated dump valve comprising:

a first duct having a first inlet, a first outlet, and an opening intermediate said first inlet and said first outlet, said first inlet being in fluid communication with said water storage space;

a second duct having a second inlet, a second outlet, said second inlet being sealingly fixed to said first duct in registry with said opening;

a valve member disposed intermediate said first inlet and said opening, said valve member being movable between a closed position and an open position, said valve member allowing fluid communication between said first inlet and a portion of said first duct intermediate said valve member and said opening when said valve member is in said open position, and said valve member preventing fluid communication between said first inlet and said portion of said first duct intermediate said valve member and said opening when said valve member is in said closed position; and a gate hingedly supported at about said opening, said gate being movable between a first and second position, said gate directing water flowing between said valve member and said opening to said second outlet when in said first position, and said gate directing water flowing between said valve member and said opening to said first outlet when in said second position.

8. The water tank for a fire truck according to claim 7, wherein the fire truck has a cab, said water tank for a fire truck further including:

a first pneumatic actuating unit acting on said valve member, said first pneumatic actuating unit being remotely controllable; and a second pneumatic actuating unit acting on said gate, said second pneumatic actuating unit being remotely controllable, whereby, said valve member can be selectively moved between said open and closed positions from inside the cab of the fire truck, and said gate can be selectively moved between said first and second positions from inside the cab of the fire truck.

9. The water tank for a fire truck according to claim 7, wherein said opening is rectangular and has an edge proximate said first outlet and an edge distal from said first outlet, and said gate is supported by a shaft rotatingly supported in proximity to said edge proximate said first outlet, said shaft rotating about an axis substantially parallel to said edge proximate said first outlet.

10. The water tank for a fire truck according to claim 7, further including a pair of stiffening braces fixed to said gate, thereby adding rigidity to said gate.

11. A gated dump valve for dumping water from a storage tank comprising:

a first duct having a first inlet, a first outlet, and an opening intermediate said first inlet and said first outlet;

a second duct having a second inlet, a second outlet, said second inlet being sealingly fixed to said first duct in registry with said opening;

a valve member disposed intermediate said first inlet and said opening, said valve member being movable between a closed position and an open position, said valve member allowing fluid communication between said first inlet and a portion of said first duct intermediate said valve member and said opening when said valve member is in said open position, and said valve member preventing fluid communication between said first inlet and said portion of said first duct intermediate said valve member and said opening when said valve member is in said closed position; and a gate hingedly supported at about said opening, said gate being movable between a first and second position, said gate directing water flowing between said valve member and said opening to said second outlet when in said first position, and said gate directing water flowing between said valve member and said opening to said first outlet when in said second position.

12. The gated dump valve according to claim 11, further including:

a first pneumatic actuating unit acting on said valve member, said first pneumatic actuating unit being remotely controllable; and a second pneumatic actuating unit acting on said gate, said second pneumatic actuating unit being remotely controllable:, whereby, when said gated dump valve is installed on a fire truck having a water tank and a cab, said valve member can be selectively moved between said open and closed positions from inside the cab of the fire truck, and said gate can be selectively moved between said first and second positions from inside the cab of the fire truck.

13. The gated dump valve according to claim 11, wherein said opening is rectangular and has an edge proximate said first outlet and an edge distal from said first outlet, and said gate is supported by a shaft rotatingly supported in proximity to said edge proximate said first outlet, said shaft rotating about an axis substantially parallel to said edge proximate said first outlet.

14. The gated dump valve according to claim 11, further including a pair of stiffening braces fixed to said gate, thereby adding rigidity to said gate.

* * * * *